United States Patent [19]
Bryant et al.

[11] Patent Number: 4,819,417
[45] Date of Patent: Apr. 11, 1989

[54] GRASS CLIPPING CATCHER

[75] Inventors: James G. Bryant, Greencastle; Ronald G. Hayden, Bainbridge, both of Ind.

[73] Assignee: F.H. & H. Limited, Rosedale, Ind.

[21] Appl. No.: 76,396

[22] Filed: Jul. 22, 1987

[51] Int. Cl.⁴ .............................................. A01D 34/70
[52] U.S. Cl. ........................................ 56/202; 56/16.6
[58] Field of Search ...................... 56/202, 16.6, 16.5, 56/12.8, 13.3; 55/337, 325, 459.3

[56] References Cited

U.S. PATENT DOCUMENTS

| | | |
|---|---|---|
| 2,134,978 | 11/1938 | Marshall . |
| 2,637,965 | 5/1953 | Simpson et al. ............ 56/16.5 |
| 3,426,513 | 2/1969 | Bauer . |
| 3,541,766 | 11/1970 | Wilson ................... 55/337 |
| 3,624,989 | 12/1971 | Gatheridge . |
| 3,664,099 | 5/1972 | Chouinard . |
| 3,708,968 | 1/1973 | Enters et al. . |
| 3,953,184 | 4/1976 | Stockford et al. .......... 55/459.3 |
| 3,974,631 | 8/1976 | Rhodes . |
| 3,987,606 | 10/1976 | Evans . |
| 4,043,100 | 8/1977 | Aumann et al. ............ 56/16.5 |
| 4,047,368 | 9/1977 | Peterson . |
| 4,054,023 | 10/1977 | Carpenter ................. 56/202 |
| 4,081,947 | 4/1978 | Szymanis . |
| 4,095,398 | 6/1978 | Aumann et al. . |
| 4,173,111 | 11/1979 | Peterson . |
| 4,251,241 | 2/1981 | Bothun . |
| 4,259,832 | 4/1981 | DuRay . |
| 4,268,288 | 5/1981 | Coombs . |
| 4,336,040 | 6/1982 | Haberl . |
| 4,345,416 | 8/1982 | Cameron . |
| 4,373,228 | 2/1983 | Dyson . |
| 4,426,830 | 1/1984 | Tackett . |
| 4,433,532 | 2/1984 | McCunn . |
| 4,593,429 | 6/1986 | Dyson . |

FOREIGN PATENT DOCUMENTS

| | | | |
|---|---|---|---|
| 2550352 | 5/1976 | Fed. Rep. of Germany ........ 55/337 |
| 2403815 | 5/1979 | France ................... 55/337 |
| 631217 | 11/1978 | U.S.S.R. .................. 55/337 |

OTHER PUBLICATIONS

E-Z Val, 10-6-1980.
Bulletin No. DC-450; Mill Mutual Fire Prevention Bureau, (on or about 1/10/51), with pp. 8 and 9 and drawing DC-275, dated 1/14/47.
"Bryant-Poff, Big-Pro, Dust Collectors Prices Effective Jun. 21, 1985"; Print #85000; Date: on or about 6/21/85.

Primary Examiner—John Weiss
Attorney, Agent, or Firm—Woodard, Emhardt, Naughton, Moriarty & McNett

[57] ABSTRACT

An improved lawn mower grass clipping catcher using vortical separation of grass clippings from exhaust air. The catcher includes a vortex exhaust baffle which deflects and diverts upward flow of air and clippings down and outwardly into the vortical flow, decreasing the escape of suspended clippings and dust from the catcher. The clippings fall into a plastic trash barrel which may contain a plastic trash bag. The barrel supports the housing in which the vortical air flow is initiated. The delivery chute is rectangular in cross section and scrolls around the housing to provide smoother air flow at the inlet of the housing by optimizing the tangentiality of entry of the inlet air. The delivery chute is rigid and provides cantilevered support for the housing when the housing is lifted about a hinge and located in a retracted position while the plastic barrel is being emptied.

21 Claims, 8 Drawing Sheets

GRASS CLIPPING CATCHER

BACKGROUND OF THE INVENTION

The present invention relates generally to the field of grass clipping catchers for lawnmowers and more specifically to cyclone separation grass clipping catchers.

A variety of grass clipping catchers have been developed over the years. A major design consideration for designing a grass catcher has been to devise a means for separating the cut grass clippings from the pressurized air flow which carries the clippings from the area of the mower blades to the clipping catcher. A common solution is to construct the clipping catcher with a material pervious to air but generally impervious to grass. However, generally, the lower the perviousness to grass a catcher has, the less the perviousness it has to air.

It is desirable to maximize the air flow through the mower and grass clipping catcher while maximizing the imperviousness of the catcher to grass clippings and other particles suspended in the air. However, air flow is impeded when filtering screens in the catcher are generally impervious to air, creating a significant back pressure of air. This back pressure, and concurrent reduced air flow, adversely affect the delivery of grass clippings from the mower to the catcher. Problems such as chute clogging and only partial pick up of grass clippings are more likely when there is reduced air flow. Thus, although highly impervious materials in the catcher improve loss of clippings and dust to the environment, they diminish the mechanical air flow delivery of grass clippings from the mower to the catcher. This problem is especially notable when grass clipping are to be caught in an impervious container such as a plastic grass bag.

One approach to this problem is disclosed in U.S. Pat. No. 3,987,606 to Evans. Evans uses a vortex flow of air in the grass catcher to separate the grass clippings from the air flow. The grass is centrifugally thrown against the walls of the catcher and precipitated towards the bottom of the catcher. The air flow exits upwardly, straight through the center of the vortex. In one embodiment, a screen is used to filter out grass clippings from the exiting air.

However, the approach used in Evans can be distinguished and improved upon. In the Evans approach, although much of the grass clippings precipitate due to the centrifugal action in the catcher, a substantial portion of clippings and associated dust still exhaust upwardly from the center of the vortex. This is true even when a screen is used to impede this clipping exhaust path. Furthermore, due to the geometry and structure of the delivery chute's interface with the catcher, the vortical flow inside the catcher is less than optimal. Also, the Evans approach requires separate means to support the housing which interfaces with the delivery chute. Finally, the round cross-section delivery chute in the Evans approach results in less than optimal vortical flow in the housing.

The disadvantages and inefficiencies of prior existing devices may be improved upon by a grass clipping catcher which takes advantage of a vortical flow separation of grass and air, while having improved aerodynamics in the flow of the grass clippings and air, baffling to prevent escape of grass clippings from the catcher, and a grass clipping vortical flow housing which is supported by the grass clipping catcher. As a result, the present invention improves upon reducing the unwanted escape of dust and other particulate matter flowing upwardly in the vortex and out of the catcher. The present invention also facilitates removal of the grass clipping container for simplified emptying.

SUMMARY OF THE INVENTION

An improved grass clipping catcher for use with a riding lawn mower having a clipping exhaust comprising a cylindrical housing having a housing wall, an upper end, a lower end and an air exhaust port centrally located in the upper end of the cylindrical housing; a grass clipping container located below the cylindrical housing; a delivery chute tangentially engaging the cylindrical housing and adapted and arranged to deliver grass clippings and air into the cylindrical housing in a vortex, the vortex having a vortex axis and an upward flow along the vortex axis; and vortex exhaust baffle means suspended below the air exhaust port and adapted and arranged for diverting the upward flow.

An object of the present invention is to provide an improved grass clipping catcher.

These and other related objects and advantages of the present invention will be apparent from the following description.

DESCRIPTION OF THE PREFERRED EMBODIMENT

Figure 1:
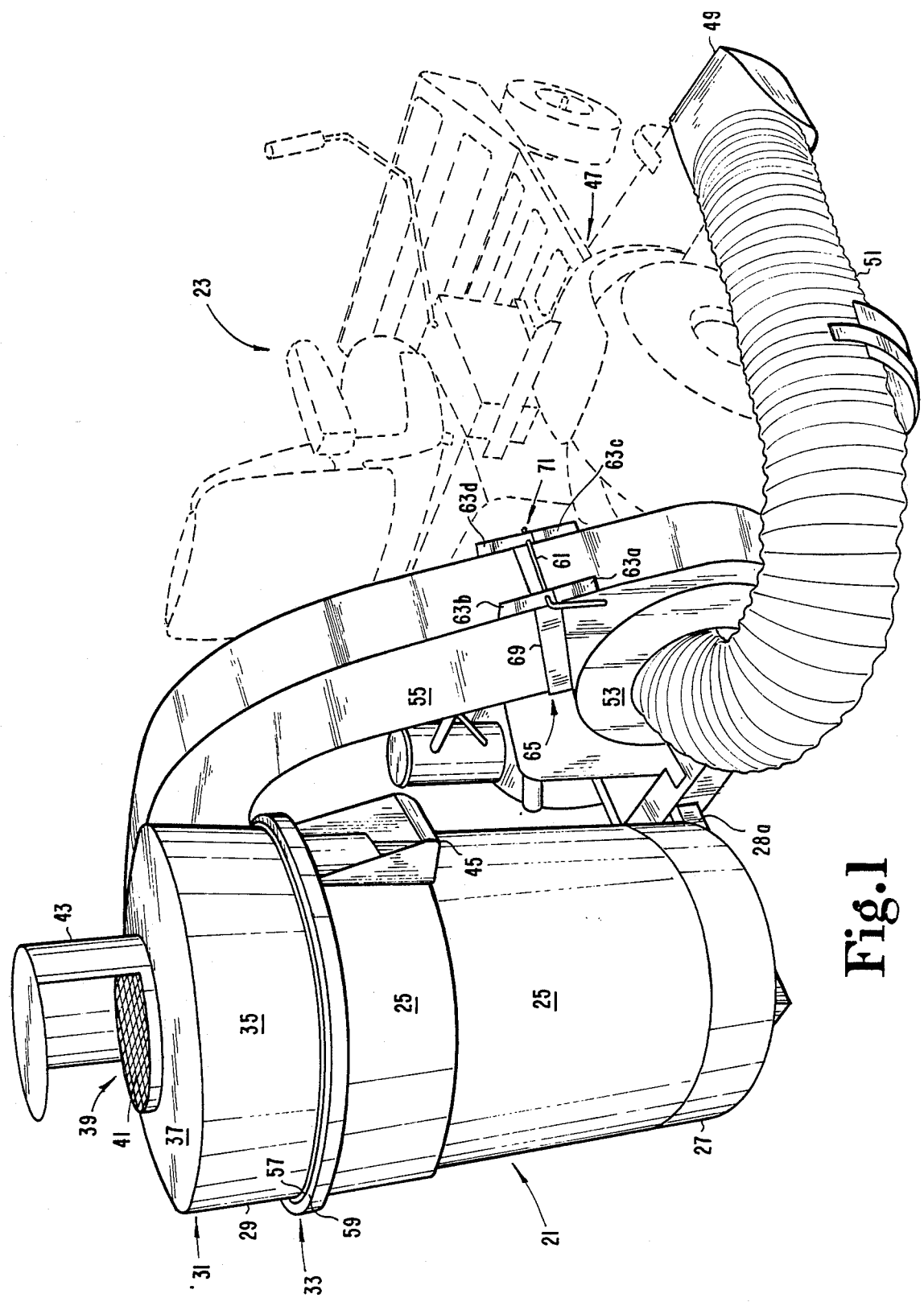
FIG. 1 is a rear perspective view of a grass catcher according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIGS. 1, 2, and 4–8, grass catcher 21 is illustrated affixed to and behind lawn mower 23 (shown in phantom lines in FIG. 1). Grass catcher 21 includes grass clipping container 25 which is a standard size, plastic trash barrel. Suitable grass clipping containers are the Rubbermaid Brute, part no. RM 2643, a 44 gallon container and part no. 2655, a 55 gallon container, offered by Rubbermaid Commercial Products, Inc., Winchester, Virginia. Grass clipping container 25 is nested in container support 27 which is cantileveredly mounted to and behind lawn mower 23. Grass catcher 21 has housing 29 located above grass clipping container 25. Housing 29 has an upper end 31 and a lower end 33. Housing 29 is cylindrical and further has a housing wall 35 and a housing top 37. Air exhaust port 39 is centrally and concentrically located in housing top 37 of housing 29. Screen 41 acts to reduce the escape of grass clippings through air exhaust port 39. Screen 41 is cylindrical in shape, being parallel to and concentric with housing wall 35. Housing cap 43 is welded onto housing top 37 and serves to deflect any escaped grass clippings away from the operator sitting on lawn mower 23. Grass clipping container 25 includes handles 45 and 77. Handle 77 is oppositely disposed from handle 45 and essentially identical. The handles facilitate removal of grass clipping container from the container support.

Lawn mower 23 is a high powered Big-Pro riding lawn mower offered by Bryant-Poff, Inc., located in Coatesville, Indiana. The lawn mower has a mower deck 47, in which grass clippings are cut from a lawn and exhausted out of mower deck 47 by way of clipping exhaust 49. Grass clippings are suspended in the air flow coming out of clipping exhaust 49 and travel through exhaust chute 51 and into blower 53. Blower 53 includes a fan (not shown) which blows the grass clippings and air upwardly through the delivery chute 55. A suitable fan for blower 53 is the Turbine Fan, part no. 56040 offered by Palmower Corporation, Thorntown, Ind. The fan in the blower is driven by a belt (not shown) connected with the lawn mower engine. Delivery chute 55 engages housing 29 to deliver air flow and suspended grass clippings into housing 29. Delivery chute 55 has a rectangular cross section. Housing 29 and delivery chute 55 are, in the preferred embodiment, made of sheet steel welded together in a rigid construction. In an alternative embodiment, housing 29 including exhaust part 39 is molded out of plastic as a single, integral member. When this approach is followed, a slight draft to the side walls enables the generally cylindrical member to be easily withdrawn from the mold. A change also has to be made to the manner in which chute 55 is attached because a metal-to-metal interface no longer exists.

Housing 29 includes support ring 57 which is welded around the circumference of housing wall 35. Housing 29 at its lower end 33 has an outside diameter less than the inside diameter of the top of grass clipping container 25. Thus, the housing slides down into grass clipping container 25. Support ring 57 has an outside diameter greater than the inside diameter of the top of the grass clipping container. Thus, the housing slides down into the grass clipping container until the point at which support ring 57 bears against the upper lip 59 of grass clipping container 25.

Figure 2:
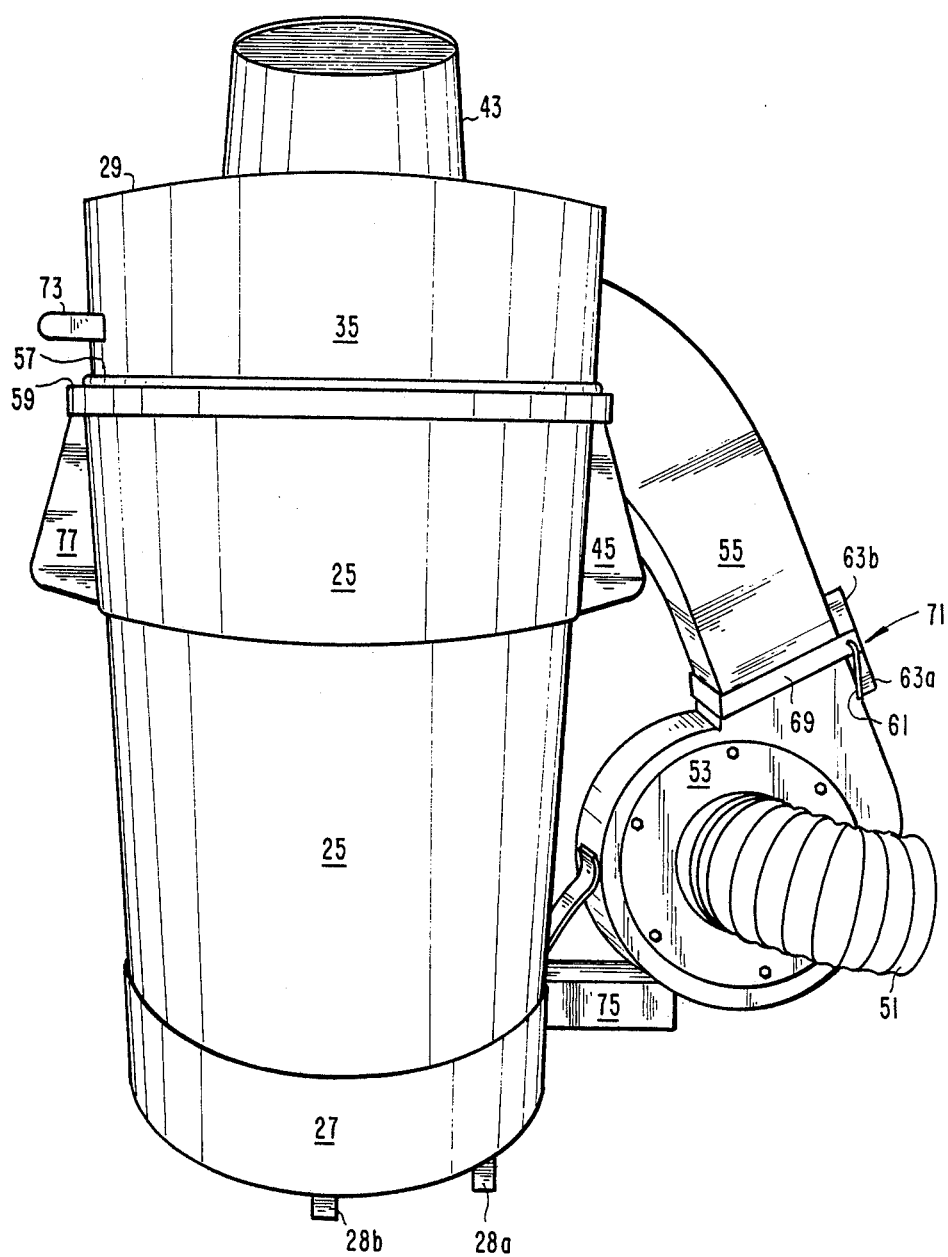
FIG. 2 is a rear elevational view of the FIG. 1 grass catcher.
Figure 6:
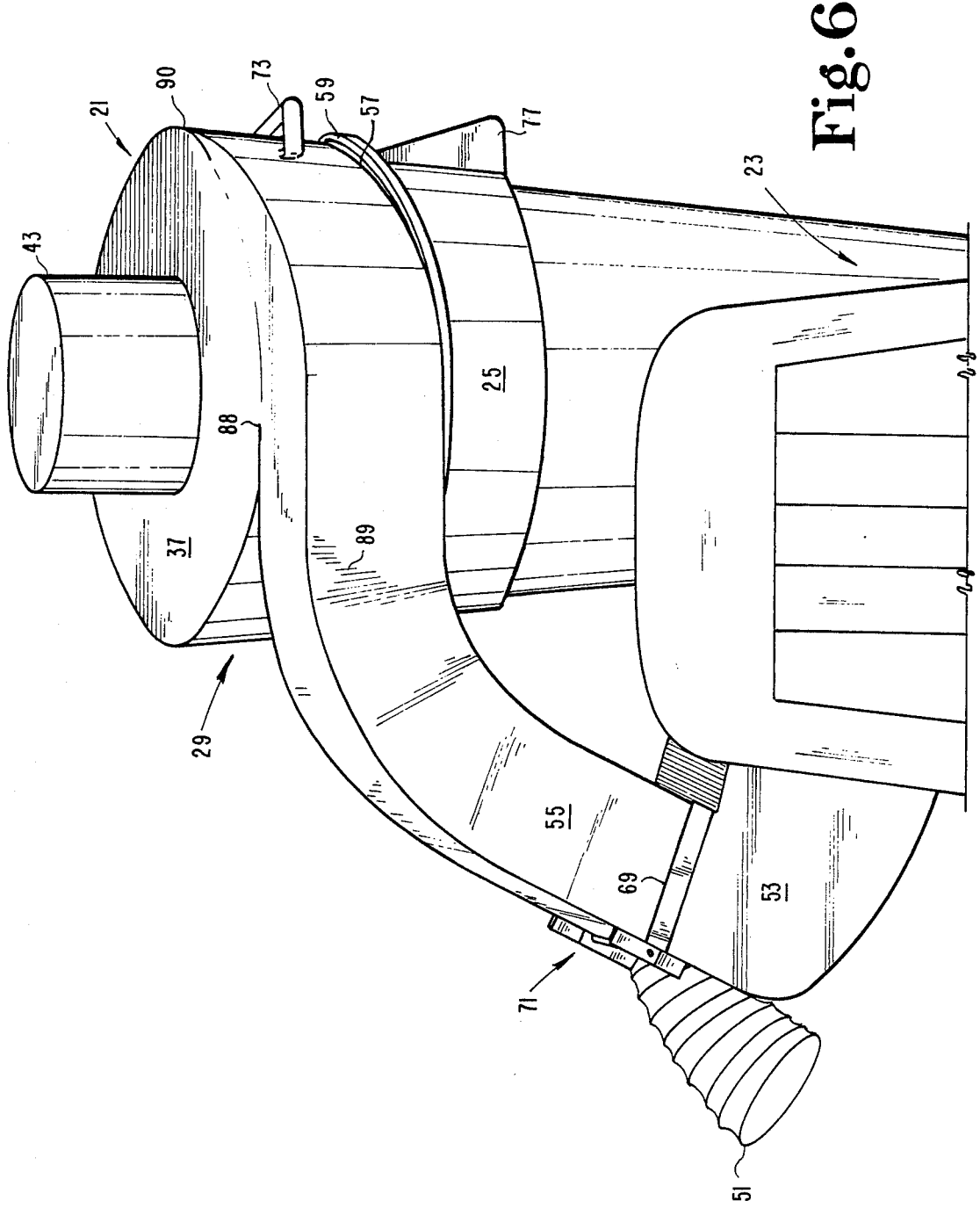
FIG. 6 is a front perspective view of the FIG. 1 grass catcher.
Figure 7:
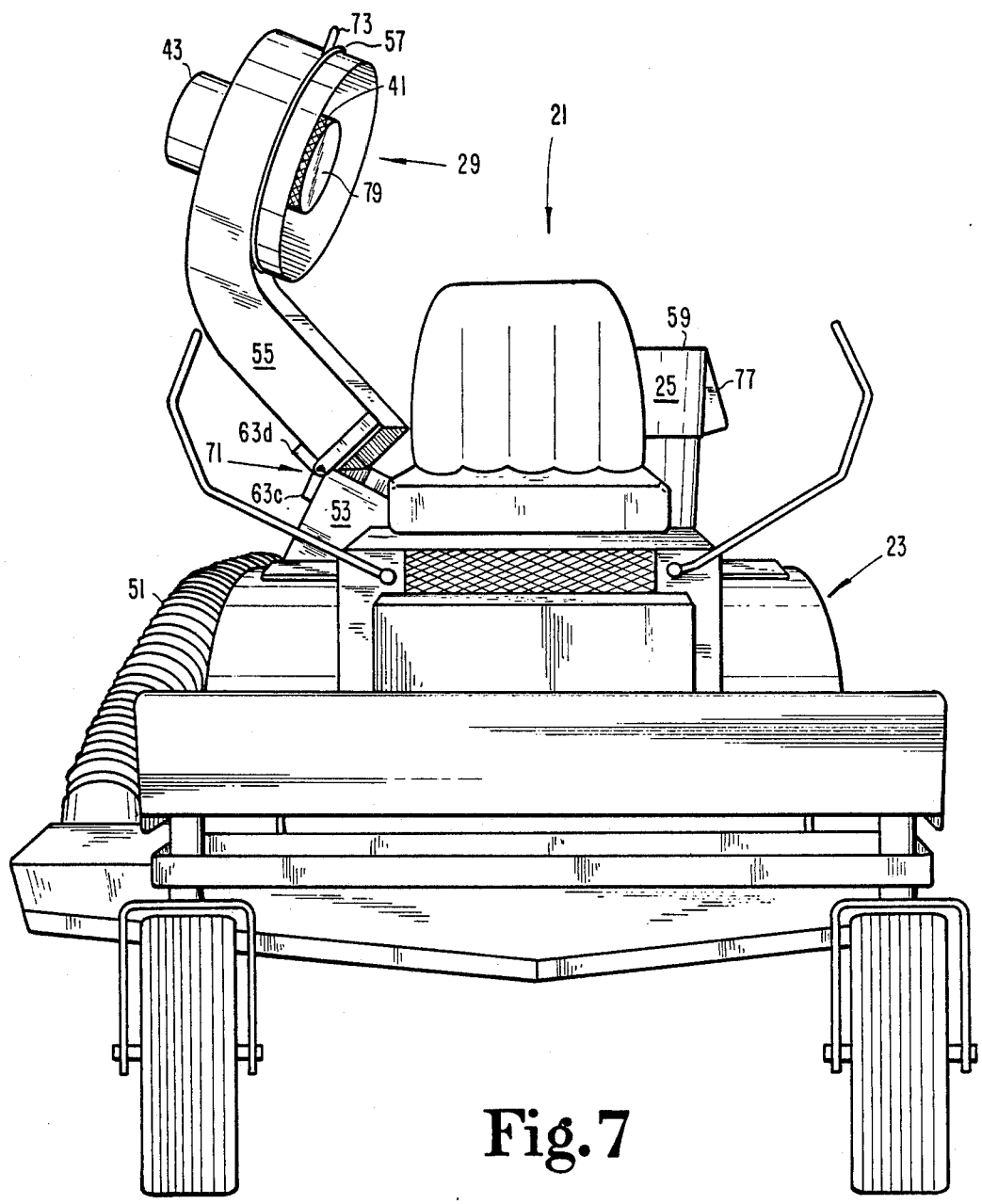
FIG. 7 is a front elevational view of the FIG. 1 grass catcher with the housing in an open position.
Figure 8:
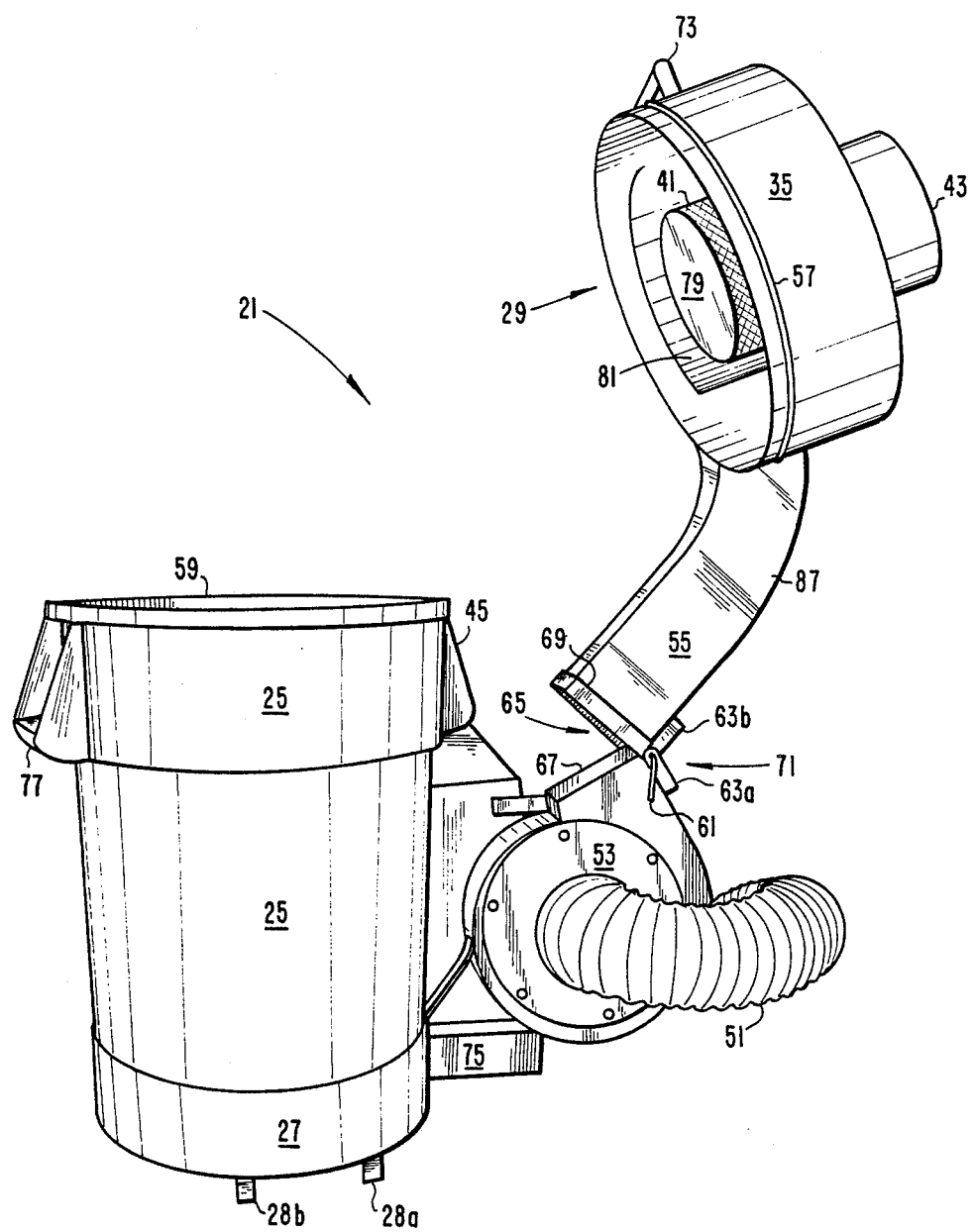
FIG. 8 is a rear elevational view of the FIG. 1 grass catcher with the housing in an open position.

Delivery chute 55 is hingedly affixed to blower 53 by hinge pin 61. Hinge pin 61 acts as a sheer pin, holding hinge brackets 63a and 63b together and hinge brackets 63c and 63d together. Blower delivery chute interface 65 is formed by a male/female junction between male fitting 67 and female fitting 69. Collectively, hinge pin 61 and hinge brackets 63a-d form hinge 71. Hinge 71 is located below the cylindrical housing 29. In other words, the hinge is closer than the housing to the ground under the grass catcher. Correspondingly, the hinge is below the center of gravity of the housing, and below the center of gravity of housing and delivery chute in combination. FIGS. 1, 2 and 6 illustrate hinge 71 in a closed position with housing 29 seated down into grass clipping container 25.

Housing handle 73 is welded to the housing and facilitates lifting housing 29 upward and hingedly about hinge 71. Blower 53 is cantileveredly suspended from support frames 28a, 28b and 28c (See FIG. 10) by blower frame 75.

Figure 3:
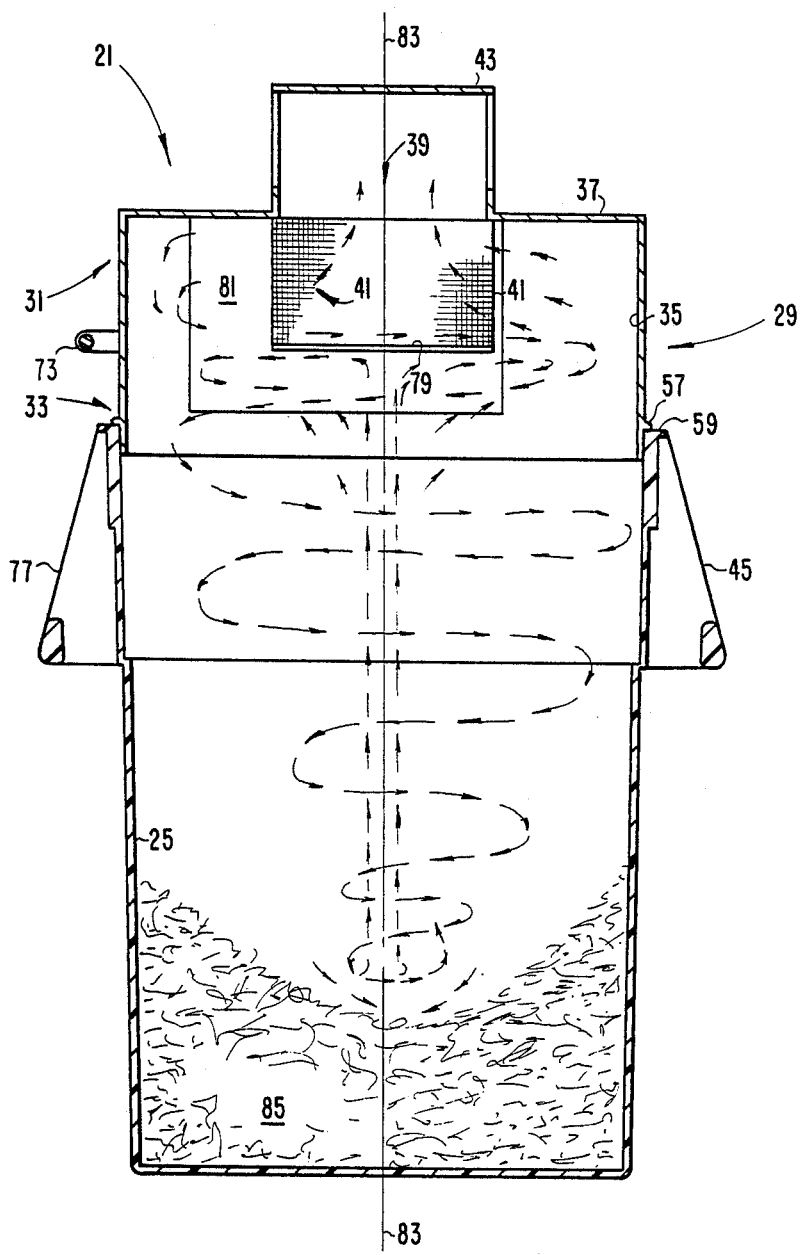
FIG. 3 is a rear elevation view in full section of the FIG. 1 grass catcher.

Referring now to FIG. 3, FIG. 3 is a full section view of grass catcher 21 removed from container support 27. Delivery chute 55 is not fully shown in FIG. 3.

Vortex exhaust baffle 79 is suspended below air exhaust port 39. Screen 41 (only shown partially in FIG. 3) forms a cylindrical screen filter around air exhaust port 39, and is concentric to and parallel with housing wall 35. Vortex exhaust baffle 79 is welded to screen 41, the screen suspending the vortex exhaust baffle in place below the air exhaust port. Housing delivery port 81 is the inlet opening which connects delivery chute 55 with housing 29. Pressurized air and grass clippings suspended in the pressurized air enter housing 29 through the housing delivery port. Delivery chute 55 tangentially engages housing 29, thus causing a vortical or cyclone air flow in housing 29 parallel to the housing wall and in the housing in grass clipping container 25 below.

The air flow in the grass catcher 21 is generally depicted by the series of arrows showing a helical cyclone motion going downward with a concentric upward flowing exhaust. The upward flowing exhaust, however, encounters vortex exhaust baffle 79 which deflects and diverts the upward flow of exhaust air and grass clippings from flowing upward in a direction parallel to the vortex axis 83 and out of the grass catcher. In this way, in the best mode of operation of the present invention, grass clippings and other dust and particulate debris which is still suspended in the exhaust air flowing upward in the central portion of the air flow, is deflected off of vortex exhaust baffle 79, causing the exhaust air and particulate matter to be deflected down and/or radially outwardly towards the housing wall 35. In this way, the grass clippings and particulate matter are reintroduced into the vortical flow of the newly incoming air, allowing the particulate matter a second opportunity to be centrifugally slung against the housing wall 35 or the walls of the grass container 25. When such clippings and particulate matter are slung against the walls, frictional force will slow their motion and cause them to precipitate downwardly to be collected in the grass clipping container. In the preferred embodiment, exhaust air is only allowed to permeate through screen 41 near the upper end 31 of housing 29. At the upper end of the housing, the tangential velocity of the air flow is the greatest, thus causing the greatest centrifugal force acting on particulate matter suspended in the air flow. Thus, little or no particulate matter comes near screen 41 which is radially inward of this tangential flow. In this way, the amount of particulate matter escaping the grass catcher 21 ia minimized. Furthermore, screen 41 further filters out any larger suspended grass clippings, which may otherwise escape. Note that grass clippings 85 are accumulating in the bottom of grass clipping container 25.

Figure 4:
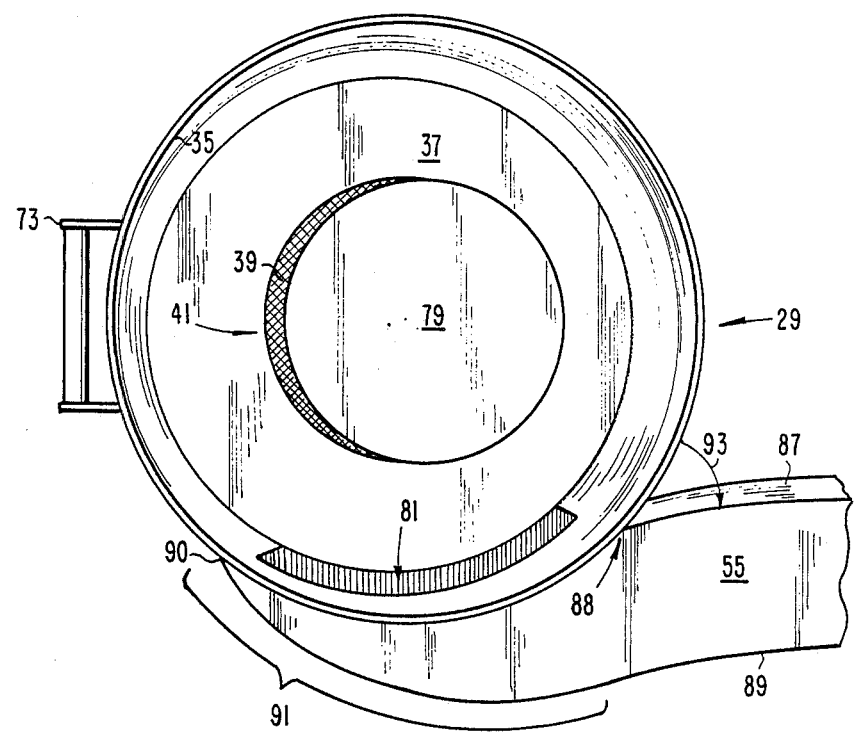
FIG. 4 is a partial cutaway bottom perspective view of the housing of the FIG. 1 grass catcher.

Referring now to FIG. 4, a bottom view of housing 29 affixed to delivery chute 55 is shown. Vortex exhaust baffle 79 is a metal plate which is round in shape and thus, has a round profile. The round profile of vortex exhaust baffle 79 corresponds in size and shape to the profile of air exhaust port 39. Delivery chute 55 has an inner wall 87 welded to housing wall 35 at inner wall engagement 88, and an outer wall 89 welded to the housing wall at outer wall engagement 90. The engagements 88 and 90 are vertical, welded seams which rigidly connect the delivery chute to the housing. Outer wall 89 has a curvilinear portion 91. Curvilinear portion 91 scrolls around the circular shape of outer wall 35 and around inner wall engagement 88. By scrolling, it is meant having the delivery chute arranged, such that the outer wall 89 and the inner wall 87 each approach a tangential engagement with outer wall 35. In this way, air flow dynamics and the vortical action is optimized. This is to be contrasted with prior grass catchers in which the outer wall and inner wall of the delivery chute are parallel to each other, rather than scrolled. Such parallel structure results in a greater angle of impingement (See 93, FIG. 4) of the inner wall when the outer wall engages the housing tangentially. In the present invention, the outer wall of the delivery chute is tangent to the collector body; the inner wall will intersect the circumference of the housing at an angle which is the angle of impingement 93 between the incoming air stream and the rotating mass of air in the collector. The thicker the delivery chute, the steeper will be the angle of impingement and the greater will be the interference between the incoming and the rotating air. Such interference increases collector back pressure, and may cause serious turbulence inside the collector. In the prior art, parallel structured delivery chute (i.e. without scrolling), if the thickness of the delivery chute is 6.7 percent of the housing diameter, the impingement angle will be 30 degrees. For a thickness of 14.7 percent, the angle will be 45 degrees, and for a thickness of 25 percent, the angle will be 60 degrees. In the present invention, the scrolled delivery chute, along curvilinear portion 91, reduces the angle of impingement 93.

The precipitation of a solid particle to the wall of the housing depends on the inlet velocity and on the thickness of the incoming air stream. At the end of the first revolution, the rotating air will be crowded away from the housing wall by the incoming air, and any solid particles which have not reached the wall during the first revolution are not likely to precipitated. It is apparent, therefore, that a thin delivery chute will reduce back pressure and inlet turbulence and will increase separating efficiency by reducing the thickness of air through which a solid particle must pass to reach the collector wall during the first revolution. Best results will be obtained when the height of the delivery chute is the full height of the collector body since this will result in a minimum thickness for required cross-sectional area.

Another factor which affects turbulence at the housing delivery port 81 is the relationship between the delivery chute thickness and the housing diameter. When the layer or ribbon of air enters the housing of the collector, the velocity is approximately uniform across the area of the inlet connection. At the point of the inlet, the air direction changes from a straight line to a curve, and the distance around the collector at the interradius of the air stream is shorter than at the outer radius. The inertia of the air at the interradius tends to sustain inlet velocity, and at the same time, friction with the body shell tends to reduce the velocity of the air at the outer radius. If the ratio of delivery chute thickness to housing diameter is too great, the incoming ribbon of air will tend to curl towards the outer circumference, and may break up into a series of vortices or whirlpools which travel around the circumference of the housing and seriously interfere with the precipitation of solid particles.

The value of the critical ratio between the inlet thickness and the housing diameter is not subject to mathematical determination, but experience indicates that it should not be greater than about 10 percent. Typically, the ratio of the dimensions of the delivery chute's height to width at the inlet should be equivalent to about 5½ to 1 for a rectangular inlet.

However, impingement interference between the incoming airstream and the rotating air within the collector can be eliminated entirely by using a scroll type of inlet connection. With this type of inlet, the incoming airstream is parallel to the rotating mass of air at the point where they come together, and the inlet interference is reduced to a minimum.

Delivery chute 55 has a rectangular cross-section to deliver a flat ribbon of air into housing 29. The scroll geometry of delivery chute 55 reduces the radially inward component of the air velocity, thus reducing inlet interference between the inlet air and the rotating mass of air in housing 29.

Figure 5:
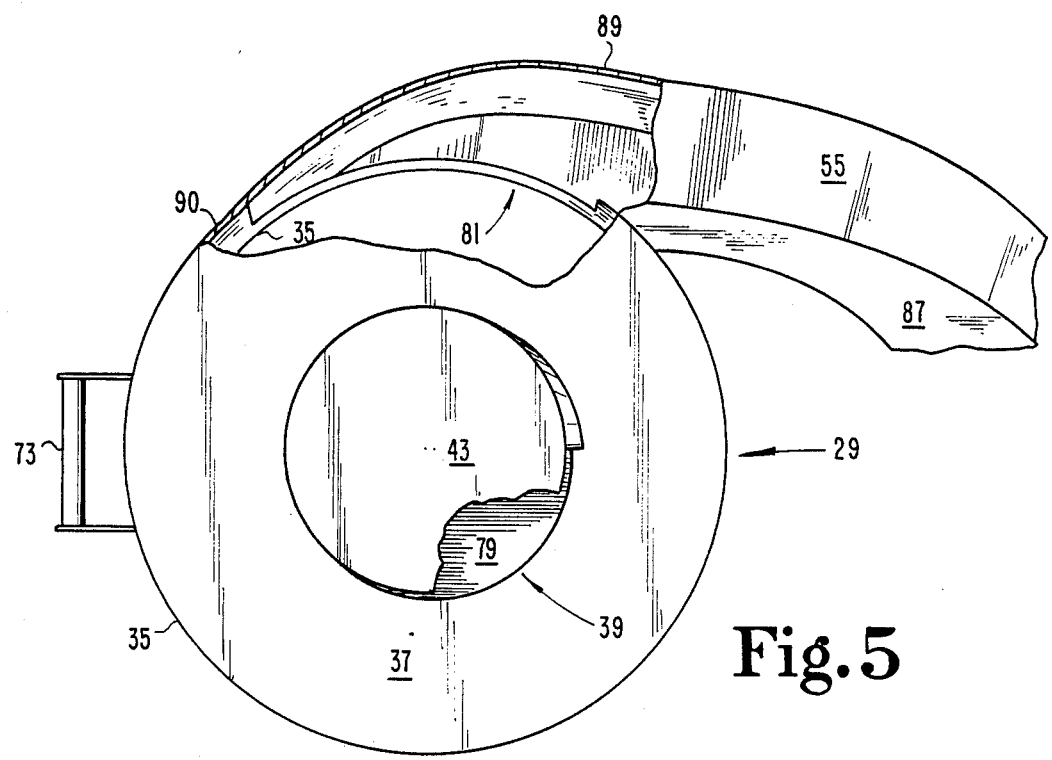
FIG. 5 is a partial fragmentary top perspective view of the FIG. 1 grass catcher.

Referring now to FIG. 5, housing cap 43 has a round profile when viewed along vortex axis 83 which corresponds to the round profile of air exhaust port 39, which in turn corresponds to the profile of vortex exhaust baffle 79 (not shown in FIG. 5). Thus, the vortex axis profile of the vortex exhaust baffle corresponds to the vortex axis profile of the air exhaust port. Note that in FIG. 5, a portion of delivery chute 55 and of housing 29 are cutaway, showing the scrolled delivery path for air and grass clippings to enter housing 29.

Referring now to FIGS. 7-10, hinge 71 is in an open position such that delivery chute 55 and housing 29 are lifted and located in a retracted position out of contact with grass clipping container 25. Delivery chute 55 is rigid steel of sufficient strength to cantileveredly suspend and support its own weight and the weight of the housing. The delivery chute is welded to housing 29 which is also rigid steel. Thus in the retracted position, delivery chute 55 and housing 29 are cantileveredly supported about hinge 71. In this retracted position, the operator is free to remove grass clipping container 25 for disposal of grass clippings therein. Alternatively, the grass clipping container 25 may include a plastic bag liner (not shown) within it to directly contain the grass clippings. The user would retract delivery chute 55 and housing 29, and then remove the plastic bag liner with grass clippings therein. Male fitting 67 is adapted in position to fit within female fitting 69 when housing 29 is lowered down into position in grass clipping container 25. Note that in FIG. 1, delivery chute 55 and housing 29 not only bear on upper lip 59 but also are cantileveredly supported at hinge 71 where male fitting 67 and female fitting 69 bear together.

Figure 9:
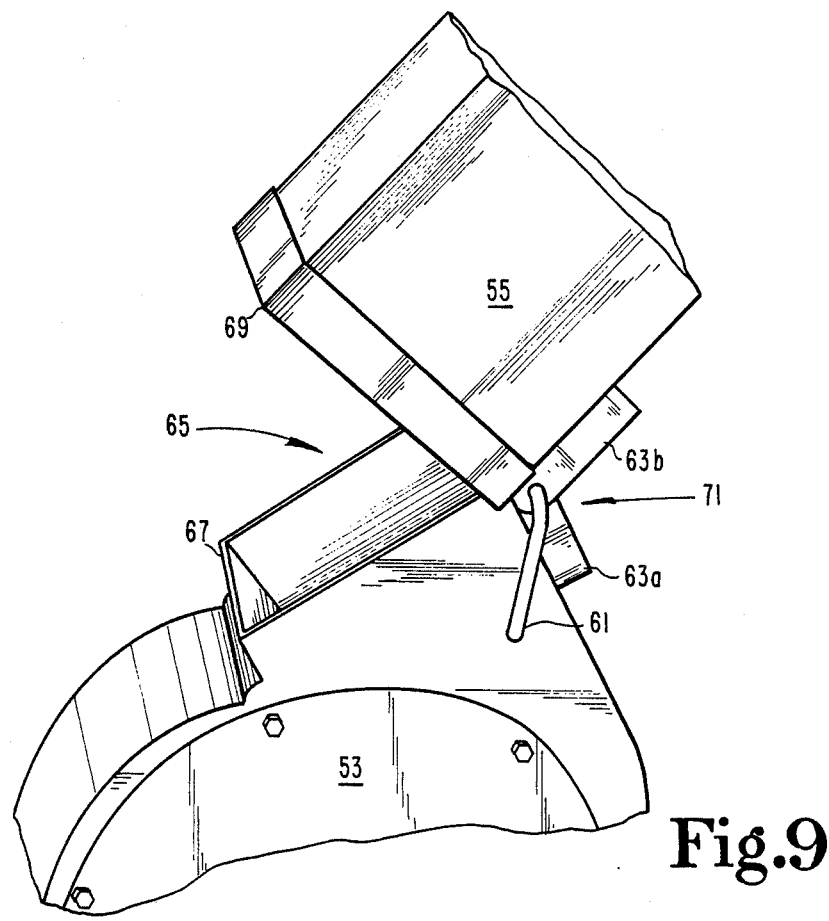
FIG. 9 is a partial rear perspective view of the hinge of the FIG. 1 grass catcher.

FIG. 9 shows a partial cutaway of delivery chute 55, blower 53, and blower-delivery chute interface 65. Male fitting 67 has a rectangular cross-section corresponding to the rectangular cross-section of female fitting 69. This rectangular cross-section is continued through the cross-section of delivery chute 55. Blower 53 contains a fan (not shown) powered by the lawn mower engine which provides additional air flow to propel the grass clipping into the housing.

Figure 10:
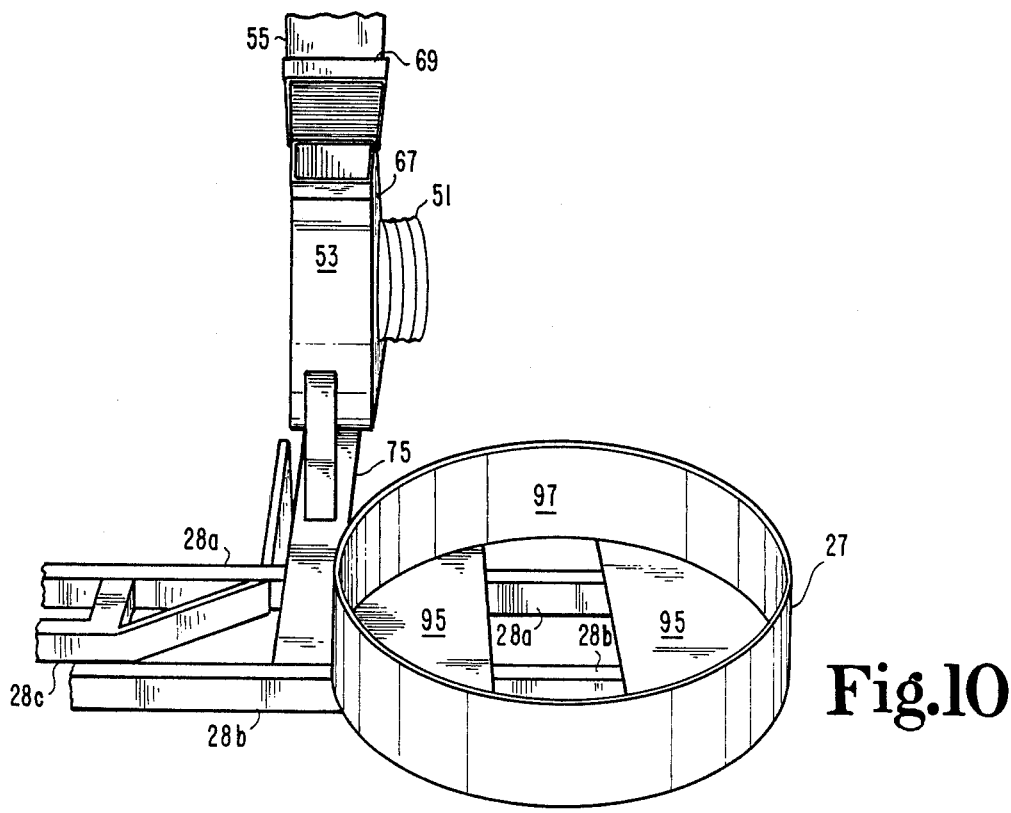
FIG. 10 is a partial side perspective view of the FIG. 1 grass catcher.

Container support 27 is cantileveredly mounted on container support frame 28a, 28b and 28c. Container support frames 28a, 28b and 28c are shown in partial cutaway from where they would be bolted to the chassis of lawn mower 23 (not shown) to suspend the support frame and the grass catcher above the ground. Container support 27 has a floor 95 and a container support wall 97. The elements disclosed in FIG. 10 are of steel and are welded together in a rigid construction. FIG. 10 is illustrated with exhaust chute 51 partially cutaway and container 25 and housing 29 removed for drawing clarity.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An improved grass clipping catcher for use with a riding lawn mower having a clipping exhaust comprising:
    a cylindrical housing having a housing wall, an upper end, a lower end and an air exhaust port centrally located in said upper end of said cylindrical housing;
    a grass clipping container located below said cylindrical housing;
    a delivery chute tangentially engaging said cylindrical housing and adapted and arranged to deliver grass clippings and air into said cylindrical housing in a vortex, said vortex having a vortex axis and an upward flow along said vortex axis; and
    vortex exhaust baffle means comprising a flat plate having a round profile suspended below said air exhaust port and adapted and arranged for diverting said upward flow.

2. The catcher of claim 1 and further comprising a screening means adapted and arranged to impede grass clippings from exhausting through said air exhaust port.

3. The catcher of claim 2 wherein said vortex exhaust baffle means has a vortex axis profile generally corresponding to the vortex axis profile of said air exhaust port.

4. The catcher of claim 3 wherein said screening means is suspended below said air exhaust port.

5. The catcher of claim 4 wherein said delivery chute is a scrolled delivery chute having an inner wall and an outer wall, said scrolled delivery chute communicating the clipping exhaust of the lawn mower with said cylindrical housing.

6. The catcher of claim 5 wherein said delivery chute has a rectangular cross section.

7. The catcher of claim 6 and further comprising:
    a blower;
    exhaust chute means for interstatially communicating said blower with the clipping exhaust of the lawn mower;
    hinge means for hingedly coupling said delivery chute with said blower, wherein said delivery chute is rigid and affixed to said cylindrical housing, and wherein said delivery chute is adapted and arranged to cantileveredly support said cylindrical housing.

8. An improved grass clipping catcher for use with a riding lawn mower having a clipping exhaust comprising:
    a cylindrical housing having a housing wall, an upper end, a lower end and an air exhaust port centrally located in said upper end of said cylindrical housing;
    a grass clipping container located below said cylindrical housing;
    a delivery chute tangentially engaging said cylindrical housing and adapted and arranged to deliver grass clippings and air into said cylindrical housing in a vortex, said vortex having a vortex axis and an upward flow along said vortex axis, wherein said delivery chute is a scrolled delivery chute having an inner wall and an outer wall, said scrolled delivery chute communicating the clipping exhaust of the lawn mower with said cylindrical housing, wherein said delivery chute has a rectangular cross section;
    vortex exhaust baffle means suspended below said air exhaust port and adapted and arranged for diverting said upward flow, wherein said vortex exhaust baffle means has a vortex axis profile generally corresponding to the vortex axis profile of said air exhaust port;
    screening means adapted and arranged to impede grass clippings from exhausting through said air exhaust port, wherein said screening means is suspended below said air exhaust port;
    a blower;
    exhaust chute means for interstatially communicating said blower with the clipping exhaust of the lawn mower;
    hinge means for hingedly coupling said delivery chute with said blower, wherein said delivery chute is rigid and affixed to said cylindrical housing, and wherein said delivery chute is adapted and arranged to cantileveredly support said cylindrical housing, wherein said hinge means is located below said cylindrical housing and wherein said cylindrical housing is removably suspended in a first position above said grass clipping container and is removable from said first position by lifting said cylindrical housing from said grass clipping container, said cylindrical housing and said rigidly affixed delivery chute hinging around said hinge means during said lifting, wherein said cylindrical housing is locatable in a retracted second position out of contact with said grass clipping container, said cylindrical housing cantileveredly suspended in said retracted second position by said delivery chute.

9. The catcher of claim 8 wherein said grass clipping container is generally rigid and supports said cylindrical housing along said lower end.

10. An improved grass clipping catcher for use with a riding lawn mower having a clipping exhaust comprising:
    a cylindrical housing having a housing wall, an upper end, a lower end and an air exhaust port centrally located in said upper end of said cylindrical housing;
    a grass clipping container located below said cylindrical housing;
    a delivery chute tangentially engaging said cylindrical housing and adapted and arranged to deliver grass clippings and air into said cylindrical housing in a vortex, said vortex having a vortex axis and an upward flow along said vortex axis;

vortex exhaust baffle means suspended below said air exhaust port and adapted and arranged for diverting said upward flow;

a blower;

exhaust chute means for interstatially communicating said blower with the clipping exhaust of the lawn mower;

hinge means for hingedly coupling said delivery chute with said blower, wherein said delivery chute is rigid and affixed to said cylindrical housing, wherein said delivery chute is adapted and arranged to cantileveredly support said cylindrical housing, and wherein said delivery chute has a rectangular cross section.

11. An improved grass clipping catcher for use with a riding lawn mower having a clipping exhaust comprising:

a cylindrical housing having a housing wall, an upper end, a lower end, and a support ring around said housing wall having an outside diameter;

a substantially rigid cylindrical plastic grass clipping container having a pair of handles thereon, said grass clipping container being located below said cylindrical housing and contacting said cylindrical housing along said lower end, wherein said grass clipping container has a top inside diameter less than said outside diameter of said support ring and is sized to receive said housing wall slidably therein with said support ring bearing against an upper lip of said grass clipping container; and a scrolled delivery chute having an inner wall and an outer wall, said scrolled delivery chute communicating the clipping exhaust of the lawn mower with said cylindrical housing.

12. The catcher of claim 11 wherein said delivery chute has a rectangular cross section.

13. The catcher of claim 12 and wherein said outer wall tangentially engages said cylindrical housing.

14. An improved grass clipping catcher for use with a riding lawn mower having a clipping exhaust comprising:

a cylindrical housing having a housing wall, an upper end and a lower end;

a grass clipping container located below said cylindrical housing and contacting said cylindrical housing along said lower end; and a scrolled delivery chute having an inner wall and an outer wall, said scrolled delivery chute communicating the clipping exhaust of the lawn mower with said cylindrical housing;

a blower;

exhaust chute means for interstatially communicating said blower with the clipping exhaust of the lawn mower;

hinge means for hingedly coupling said delivery chute with said blower, wherein said delivery chute is rigid and affixed to said cylindrical housing, and wherein said rigid delivery chute is adapted and arranged to cantileveredly support said cylindrical housing.

15. An improved grass clipping catcher for use with a riding lawn mower having a clipping exhaust comprising:

a cylindrical housing having a housing wall, an upper end and a lower end;

a grass clipping container located below said cylindrical housing and contacting said cylindrical housing along said lower end; and a scrolled delivery chute having an inner wall and an outer wall, said scrolled delivery chute communicating the clipping exhaust of the lawn mower with said cylindrical housing;

a blower;

exhaust chute means for interstatially communicating said blower with the clipping exhaust of the lawn mower;

hinge means for hingedly coupling said delivery chute with said blower, wherein said delivery chute is rigid and affixed to said cylindrical housing, and wherein said rigid delivery chute is adapted and arranged to cantileveredly support said cylindrical housing, wherein said hinge means is located below said cylindrical housing and wherein said cylindrical housing is removably suspended in a first position above said grass clipping container and is removable from said first position by lifting said cylindrical housing from said grass clipping container, said cylindrical housing and said rigidly affixed delivery chute hinging around said hinge means during said lifting, wherein said cylindrical housing is locatable in a retracted second position out of contact with said grass clipping container, said cylindrical housing cantileveredly suspended in said retracted second position by said delivery chute.

16. The catcher of claim 15 wherein said grass clipping container is substantially rigid and supports said cylindrical housing along said lower end.

17. The catcher of claim 16 wherein said delivery chute has a rectangular cross section.

18. The catcher of claim 17 and further comprising a handle affixed to said housing, and wherein said outer wall tangentially engages said cylindrical housing.

19. An improved grass clipping catcher for use with a riding lawn mower having a clipping exhaust comprising:

a cylindrical housing having a housing wall, an upper end, a lower end, and a support ring around said housing wall having an outside diameter;

a substantially rigid grass clipping container located below said cylindrical housing and supporting said cylindrical housing along said lower end, wherein said grass clipping container has a top inside diameter less than said outside diameter of said support ring and is sized to receive said housing wall slidably therein with said support ring bearing against an upper lip of said grass clipping container;

a scrolled delivery chute having an inner wall and an outer wall, said scrolled delivery chute communicating the clipping exhaust of the lawn mower with said cylindrical housing, wherein said inner wall of said scrolled delivery chute engages said housing wall at a first engagement, and wherein said outer wall of said scrolled delivery chute circumferentially scrolls around said first engagement and tangentially engages said housing wall at a second engagement, and wherein said delivery chute is adapted and arranged to deliver a vortex of grass clippings and air into said cylindrical housing.

20. An improved grass clipping catcher for use with a riding lawn mower having a clipping exhaust comprising:

a cylindrical housing having a housing wall, an upper end and a lower end;

a substantially rigid grass clipping container located below said cylindrical housing and supporting said cylindrical housing along said lower end;

a scrolled delivery chute having an inner wall and an outer wall, said scrolled delivery chute communicating the clipping exhaust of the lawn mower with said cylindrical housing, wherein said inner wall of said scrolled delivery chute engages said housing wall at a first engagement, and wherein said outer wall of said scrolled delivery chute circumferentially scrolls around said first engagement and tangentially engages said housing wall at a second engagement, said scrolled delivery chute adapted and arranged to delivery grass clippings and air into said cylindrical housing in a vortex, said vortex having a vortex axis and an upward flow parallel to said vortex axis;

an air exhaust port centrally located in said upper end of said cylindrical housing;

a screening means adapted and arranged to impede grass clippings from exhausting through said air exhaust port; and vortex exhaust baffle means suspended below said air exhaust port and adapted and arranged for diverting said upward flow.

21. The catcher of claim 19 wherein said scrolled delivery chute has a rectangular cross section.

* * * * *